Feb. 19, 1963  E. R. MURAWSKI  3,077,664
ELECTRIC GRASS TRIMMER
Filed Feb. 21, 1961  2 Sheets-Sheet 2
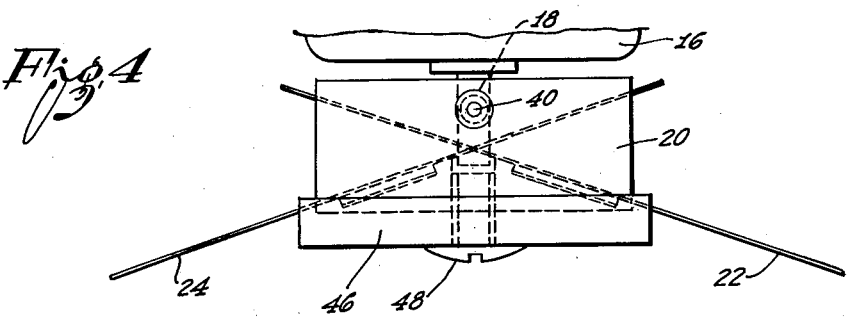
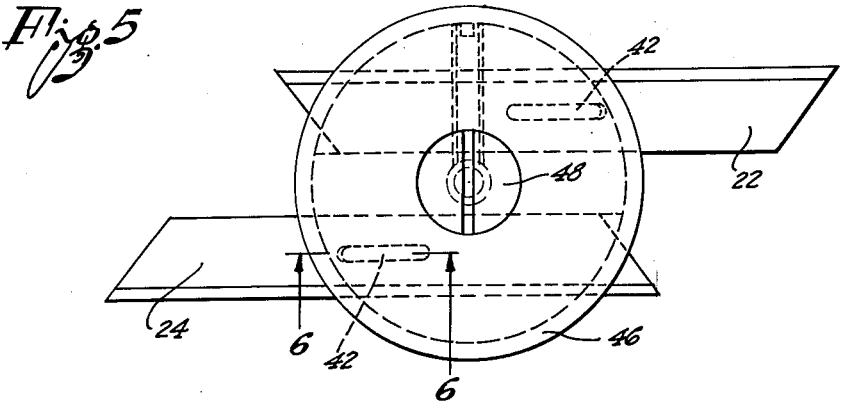
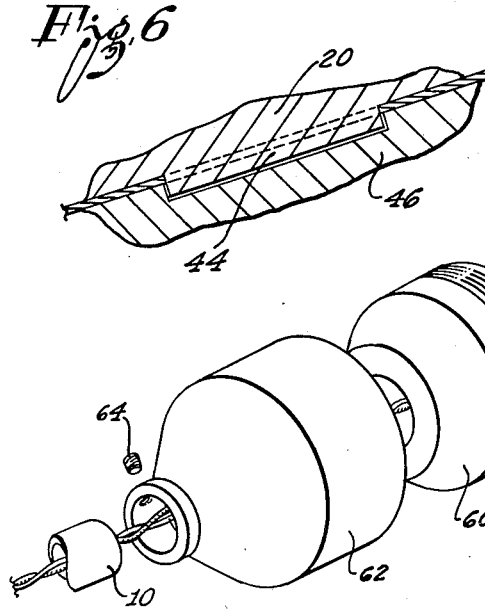
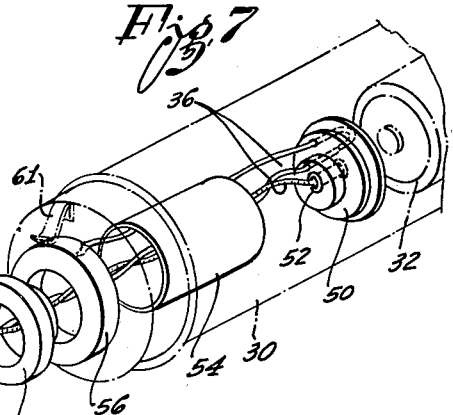
INVENTOR
Edmund R. Murawski
By Keith D. Beecher
Attorney

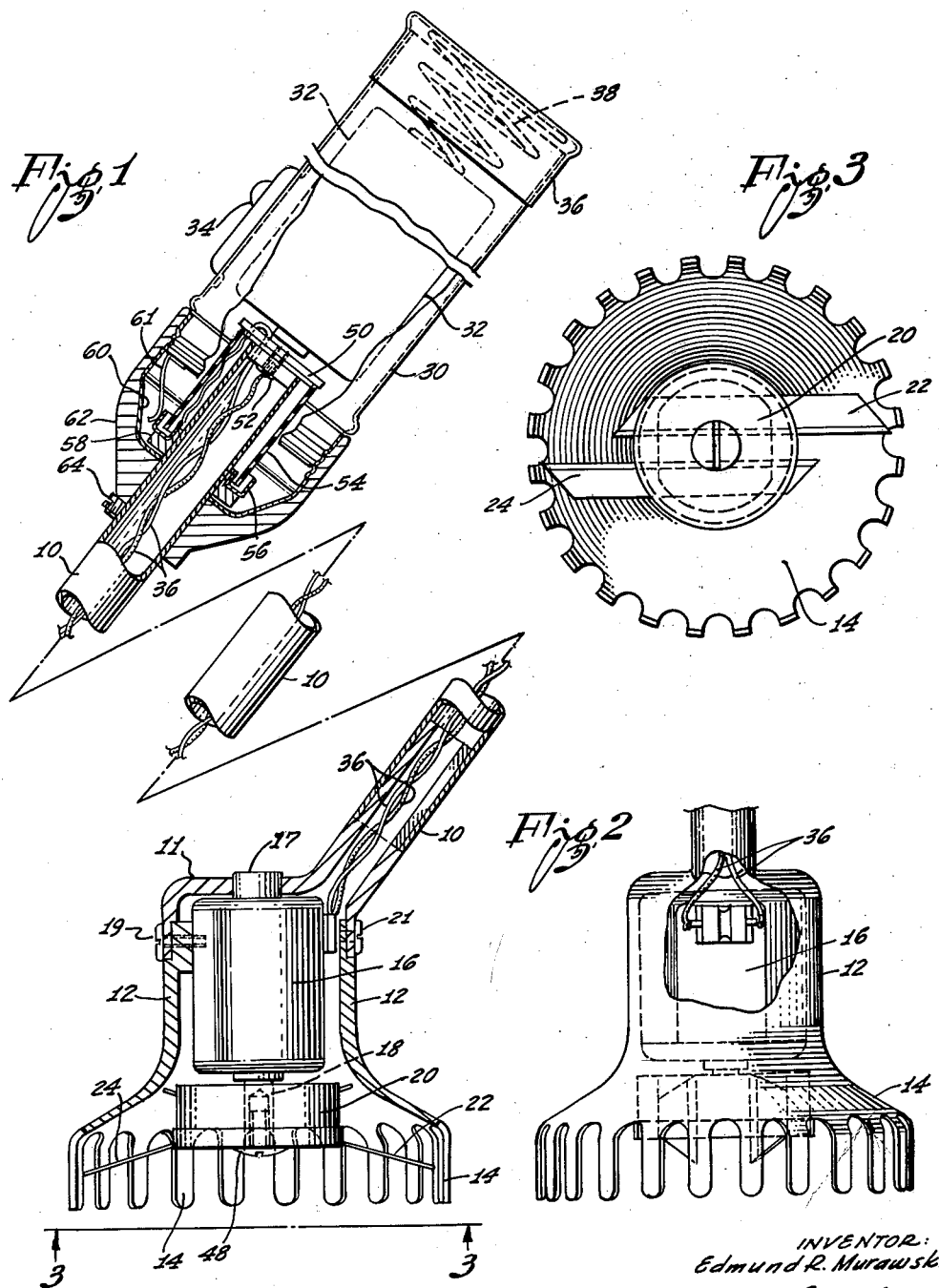

United States Patent Office

3,077,664
Patented Feb. 19, 1963

3,077,664
ELECTRIC GRASS TRIMMER
Edmund R. Murawski, Chicago, Ill., assignor to Phonex Instrument Company, Inc., Chicago, Ill., a corporation of Indiana
Filed Feb. 21, 1961, Ser. No. 90,839
4 Claims. (Cl. 30—276)

The present invention relates to a new and improved electric trimmer, which is particularly suited as a grass trimmer for trimming the margins and the normally inaccessible areas of lawns, and which also has general utility for trimming bushes, hedges, and the like.

An important object of the invention is to provide an improved electric trimmer of the type mentioned above, and which is constructed so that all trimming is greatly facilitated and can be carried out without the need for the operator to assume an uncomfortable position and without the need for tiring or hand blistering manual operations.

Another object of the invention is to provide such an improved electric trimmer which is fully portable and easy to handle, and which is constructed to have a balanced weight distribution so that efficient cutting may be carried out in a comfortable manner and by a simple back and forth stroking action.

Yet another object of the invention is to provide such an improved electric trimmer which is simple and rugged in its construction, relatively light in weight and relatively low in cost.

A feature of the invention is the provision of a battery operated electric trimmer which is completely portable and does not require 110 volts or other high voltage outlets; and which may be operated with complete safety, even with wet grass, on readily replaceable usual low voltage dry cell batteries.

Another feature of the invention is the provision of an electric trimmer which includes as a safety feature a guard member, and in which the cutting elements are contained within the confines of the guard member and do not project therefrom.

Yet another feature of the invention is the provision of such an improved electric trimmer in which the cutting elements are in the form of radial blades which are mounted in a manner to prevent grass from winding about the cutting elements, or about the associated drive elements, and thereby becoming tangled so as to jam the trimmer.

A still further feature is the provision of cutting elements which may be replaceable, and which may take the form of available types of wood carving blades.

The above and other features of the invention which are believed to be new are set forth in the claims. The invention itself, however, may best be understood by reference to the following specification when taken in conjunction with the accompanying drawings, in which:

FIGURE 1 is a side sectional view of an electric trimmer constructed in accordance with one embodiment of the invention;

FIGURE 2 is a side view, partly in section, of the lower portion of the trimmer of FIGURE 1, turned 90 degrees to reveal certain electrical connections to an electric motor mounted in that portion;

FIGURE 3 is a bottom view of the assembly substantially on the line 3—3 of FIGURE 1, and with the cutting blade elements removed;

FIGURE 4 is a side view of the cutting blade elements of the trimmer of FIGURE 1, and of the retainer for the cutting blade elements, this view being on an enlarged scale with respect to FIGURES 1–3;

FIGURE 5 is a bottom view, also on an enlarged scale, of the cutting blade elements of the electric trimmer of the invention, and of the retainer for those elements;

FIGURE 6 is an enlarged, fragmentary, sectional view, substantially on the line 6—6 of FIGURE 5, and illustrating the manner in which one of the cutting blade elements is retained in the retainer; and FIGURE 7 is an exploded perspective view of the handle portion of the trimmer of FIGURE 1, illustrating the manner in which the handle is secured to the hollow shaft of the trimmer shown in FIGURE 1.

The electric grass trimmer illustrated in FIGURES 1–6 includes a hollow shaft 10. This shaft 10 may be formed of any suitable material, such as brass or aluminum. The shaft may, for example, have an outside diameter of ½ inch and a length of 35½ inches. A motor housing 12 is mounted at the lower end of the hollow shaft 10. The motor housing 12 is in the form of a shroud and has a generally cylindrical configuration. The shroud or housing 12 has a serrated guard member 14 formed integral with it. The guard member 14, as shown, has a flared bell-like configuration, and it is open at the bottom. An electric motor 16 is mounted within the housing 12 in co-axial relationship with the housing, and the motor 16 includes a drive shaft 18 which extends down along the longitudinal axis of the housing 12. The motor 16, for example, may rotate at 9,000 r.p.m. As best shown in FIGURE 1, the lower end of the shaft 10 is formed into a dish-shaped head 11 having a central aperture therein. The motor bearing 17 projects through the central aperture so as to position the motor 16 in the shroud 12. A screw 19 extends through the head 11 and through the shroud 12 into the motor 16. This screw serves to fasten the head to the shroud and to mount the motor 16 in the shroud. A second mounting screw 21 extends through the head 11 into the shroud 12.

A cutting blade holder or retainer member 20 is mounted on the drive shaft 18 to be rotated thereby, and the blade holder 20 is positioned within the serrated guard member 14. The holder 20 may be formed, for example, of die cast aluminum. A pair of cutting blades 22 and 24 are supported in the retainer 20, in a manner to be described. The cutting blades 22 and 24 extend outwardly from the blade retainer 20 toward the inner surface of the wall of the guard member 14. The cutting blades 22 and 24 are contained entirely within the confines of the guard member 14 as a safety feature. All the cutting is accomplished at the point of each blade in its peripheral sweep. As illustrated in FIGURES 2 and 4, for example, these blades extend at an inclination to the axis of rotation of the drive shaft. This prevents wind-up of long grass around the retainer 20.

The cutting blades 22 and 24 may be, for example, a known type of wood carving blade. This type of blade is obtainable in hobby shops and is sold under the trade designation "X-Acto" wood carving blade. This type of blade, as will be described in more detail has a mounting slot formed therein, and the mounting slot is so configured that it is impossible to mount the blade with its cutting edge facing the wrong way.

A hollow handle member 30 is mounted at the upper end of the hollow shaft 10. This handle member defines a battery housing and supports one or more batteries 32. The batteries 32 may be of the usual flashlight type. A usual switch means 34 is mounted on the side of the handle 30, and this switch causes a pair of leads 36 to be selectively connected across the battery terminal. The leads 36 extend down the hollow handle to be electrically connected to the motor 16, as best shown in FIGURE 2.

The electric grass trimmer thus far described may be grasped by the handle 30, and the motor 16 may be selectively energized by actuation of the switch 34. It will be appreciated that the electric trimmer is fully portable and easy to handle. The batteries in the handle portion 30 serve to balance the weight of the electric motor 16 so that the electric trimmer has a balanced weight distribution to facilitate efficient cutting by the operator. The batteries 32 may be usual flashlight dry cell batteries, and they are readily replaceable. For example, an end portion 36 may be screwed to the handle 30, and a metallic spring 38 may serve to resiliently bias the batteries forward in the handle portion. This is in accordance with usual flashlight construction practices.

As best shown in FIGURES 4 and 5, and as noted above, the blades 22 and 24 may be a usual type of wood carver blade, and may be replaceable as desired. The blade retainer 20 is supported on the drive shaft 18 of the electric motor 16 by means, for example, of a set screw 40. The blades 22 and 24 are supported in the blade holder or retainer 20 in an inclined position, as shown. The blades, as is usual with blades of this type, have central slots 42 formed therein, and the retainer 20 includes projections, such as the projection 44 in FIGURE 6, which extends through the slots 42 to hold the blades in place. As noted above, the slots 42 are configured so that the blades 22 and 24 cannot be mounted incorrectly.

The retainer includes a cap 46 which has a mating configuration with respect to the face of the retainer 20. The cap 46 is removably held in place by a screw 48. The screw 48 may be an 8–32 x 5/16" brazier head screw, as shown, so as to obviate the possibility of blades of grass winding up on the screw head. The screw 48 extends through the cap, and it is threaded into a tapped hole in the retainer 20 in axial alignment with the motor shaft 18. Therefore, the blades 22 and 24 are held in place by the retainer cap 46, the retainer cap in turn being supported on the retainer 20 by the screw 48. Whenever it is desired to replace the blades 22 and 24, it is merely necessary to loosen the screw 48 which releases the blades. It will be seen from FIGURE 4 that the motor shaft 18 extends into one-half of the central aperture in the retainer 20 and the screw 48 extends into the other half of the central aperture.

The cutting blades 22 and 24 are accurately made, and replacements do not tend to disturb the initial dynamic balance of the assembly. The initial balance is achieved by electronic means during the manufacture of the units.

The retainer 20 and cap 46 also function as a flywheel; and the flywheel provides cutting power and prevents stalling of the motor. In the proper use of the trimmer unit, and as mentioned above, the unit is swung "to" and "fro" in a comfortable arc motion with the open lower face of the shroud 12 angled to the grass on the "to" swing. This "to" swing is the cutting stroke and the flywheel contributes power during this stroke. Then on the "fro" swing the flywheel has the opportunity to regain momentum since the open face of the shroud and the whirling blades are receding from the grass.

The handle portion 30 may be attached to the top of the hollow shaft 10 in the manner illustrated by the exploded view of FIGURE 7. As illustrated in the exploded view, the positive electrode of the bottom dry cell 32 in the handle portion 30 engages an eyelet 52 in an insulating disc member 50. The disc member 50 is composed, for example, of hard fiber, and the eyelet 52 is a metal electrically-conductive eyelet extending through it. One of the leads 36 extends through the member 50 for connection to the one contact of the switch 34, in a manner well understood by the art. The other lead 36 is soldered to the eyelet 52. A spacer tube 54 is interposed between the member 50 and the end of the handle portion. This tube may, for example, be composed of stiff impregnated paper. The spacer tube 54 engages an electrically conductive annular switch contact member 56, this latter member having a re-entrant configuration, and is best shown in FIGURE 1. The switch contact 56 is supported by an insulating annular ferrule 58 which may be formed, for example, of hard fiber.

As best shown in FIGURES 1 and 6, one of the leads 36 extends through the eyelet 52 and is soldered thereto. This lead is, therefore, connected to the positive electrode of the lower dry cell 32, as noted above. The other lead 36 passes through a first hole in the fiber disc member 50 adjacent the eyelet 52, and it returns back through an outer aperture in the disc member. The return lead passes inside the spacer tube 54, but outside the tube 10, to be connected to the annular contact 56.

The assembly described above is held locked in position in a manner best shown in FIGURE 1. The shaft 10 surrounds a central portion of the disc member 50 in friction fit therewith so that the disc member is supported on the end of the shaft 10. The spacer tube 54 holds the annular contact 56 against the ferrule 58 which, in turn, is held in position by a sleeve 60. The sleeve 60 may, for example, be a usual flashlight end cap.

The elements described above are held in place by the sleeve 60 which has internal threads so that it may be threaded to the end of the handle portion 30. The sleeve 60 is enclosed by an end portion 62 which is pressed over the sleeve to provide the internal threads. The end portion 62 has a conical configuration, and its lower end has a reduced diameter to receive the hollow shaft 10. The hollow shaft is held in place in the end portion 62 by means, for example, of a set screw 64. This set screw extends through the reduced diameter section of the end portion 62 into engagement with the shaft 10.

The switch 34 is a usual flashlight slide switch. When the switch 34 is in its "off" position the contact strip 61 rests against the side of the paper spacer tube. However, when the switch is in its "on" position, the contact strip 61 engages the contact 56 to complete the circuit to the negative electrode of the top dry cell in the handle through the cap 36 and spring 38 in a manner well understood in the flashlight art.

The invention provides, therefore, an improved electric grass trimmer which, as noted above, may be conveniently held in the hand of an operator; and which permits the normally inaccessible areas of lawns to be conveniently trimmed without the need for tiring manual operations. As also noted, the trimmer described above also finds general utility for trimming bushes, hedges and the like.

An important feature of the invention is its complete portability. No connections are needed to 110 volt outlets. Also, there is no shock hazard as is the case with 110 volt, and other high voltage equipment, when used to trim wet grass.

I claim:

1. An electric grass trimmer including: an electric motor housing of substantially tubular configuration; an electric motor coaxially mounted within said motor housing and having a drive shaft rotatable about the longitudinal axis of said tubular motor housing; cutting blade retainer means coupled to said drive shaft to be rotatably driven thereby; an elongated tubular shaft affixed to said tubular motor housing and extending upwardly therefrom at inclination to said longitudinal axis thereof, said tubular shaft having a diameter small as compared with the diameter of said tubular motor housing; an elongated tubular hollow handle member mounted at the upper end of said tubular shaft defining a battery housing and having a diameter large as compared with the diameter of said tubular shaft; battery contact means mounted on said battery housing; manually operated switch means mounted on said handle member; and wire connecting means extending down said tubular shaft from said battery housing to said motor housing, said wire connecting means being connected to said battery contact means and to said switch means in said battery housing at one end and to said electric motor in said motor housing at the other end for controllably energizing said motor.

2. In an electric grass trimmer which includes an elongated tubular hollow shaft, a hollow handle member defining a battery housing at one end of said shaft, an electrical conductor means extending down said shaft from said battery housing, the combination of: a tubular motor housing mounted at the lower end of said shaft having a longitudinal axis inclined to the longitudinal axis of said shaft; an electric motor coaxially mounted within said housing and including a drive shaft rotatable about said longitudinal axis of said tubular housing; a serrated cup-shaped annular guard member positioned at the lower edge of said motor housing; cutting means; and retaining means coupled to said drive shaft for mounting said cutting means on said drive shaft to be rotated thereby, said cutting means extending at an inclination to and radially from said longitudinal axis of said tubular housing into proximity with the inner surface of said guard member to be enclosed by said guard member.

3. The combination defined in claim 2 in which said cutting means includes a pair of elongated blades extending radially outwardly from said retaining means at an inclination to the longitudinal axis of said motor housing and into close proximity with the inner surface of the wall of said serrated guard member to be contained entirely within the confines of said guard member.

4. The combination defined in claim 2 in which said retaining means has substantial mass so as to function as a flywheel.

References Cited in the file of this patent

UNITED STATES PATENTS

| | | |
|---|---|---|
| 2,040,683 | Biniek | May 12, 1936 |
| 2,054,418 | Hartman | Sept. 15, 1936 |
| 2,091,827 | Mercatoris | Aug. 31, 1937 |
| 2,242,524 | Hunt | May 20, 1941 |
| 2,683,310 | Majeski | July 13, 1954 |
| 2,684,532 | Sumstad | July 27, 1954 |
| 2,722,095 | Farney | Nov. 1, 1955 |
| 2,740,198 | Edgett | Apr. 3, 1956 |
| 2,773,306 | Ranson | Dec. 11, 1956 |
| 2,786,322 | McEvers | Mar. 26, 1957 |
| 2,963,844 | Englers | Dec. 13, 1960 |